United States Patent [19]
Baudu et al.

[11] Patent Number: 6,045,091
[45] Date of Patent: Apr. 4, 2000

[54] THRUST REVERSER WITH IMPROVED IMPACT STRENGTH

[75] Inventors: Pierre André Marcel Baudu, Le Havre; Patrick Gonidec, Montivilliers; Pascal Gérard Rouyer, Saint Aubin Routot; Guy Bernard Vauchel, Le Havre, all of France

[73] Assignee: Societe Hispano Suiza Aerostructures, France

[21] Appl. No.: 09/113,319

[22] Filed: Jul. 10, 1998

[30] Foreign Application Priority Data

Jul. 10, 1997 [FR] France .................................. 97 08762

[51] Int. Cl.[7] ................................ F02K 1/70; F02K 1/00; F02K 3/02
[52] U.S. Cl. ................. 244/110 B; 244/121; 244/110 D; 239/265.25; 239/265.33; 60/226.2; 60/230
[58] Field of Search .............................. 244/121, 110 B, 244/110 D; 239/265.11, 265.17, 265.19, 265.23, 265.25, 265.31, 265.33, 265.39; 60/226.2, 230, 223

[56] References Cited

U.S. PATENT DOCUMENTS

| | | |
|---|---|---|
| 3,600,023 | 8/1971 | Gudde . |
| 3,752,519 | 8/1973 | Nordell et al. .......................... 292/111 |
| 4,422,605 | 12/1983 | Fage ..................................... 244/110 B |
| 4,613,099 | 9/1986 | Smith et al. . |
| 4,801,112 | 1/1989 | Fournier et al. ..................... 244/110 B |
| 5,224,342 | 7/1993 | Lair ........................................... 60/230 |
| 5,280,704 | 1/1994 | Anderson et al. ...................... 60/226.2 |
| 5,310,117 | 5/1994 | Fage et al. .......................... 239/265.29 |
| 5,448,884 | 9/1995 | Repp ......................................... 60/223 |
| 5,547,130 | 8/1996 | Davies ................................ 239/265.29 |
| 5,720,449 | 2/1998 | Laboure et al. ..................... 244/110 B |
| 5,735,557 | 4/1998 | Harvey .................................... 292/216 |
| 5,819,527 | 10/1998 | Fournier ................................ 60/226.2 |
| 5,826,823 | 10/1998 | Lymons et al. ..................... 244/110 B |
| 5,904,041 | 5/1999 | Dhainault ............................... 60/226.2 |

FOREIGN PATENT DOCUMENTS

| | | |
|---|---|---|
| 0 656 469 | 6/1995 | European Pat. Off. . |
| 0 763 654 | 3/1997 | European Pat. Off. . |
| 2 711 187 | 4/1995 | France . |

*Primary Examiner*—Michael J. Carone
*Assistant Examiner*—James S. Bergin
*Attorney, Agent, or Firm*—Bacon & Thomas PLLC

[57] ABSTRACT

An aircraft gas turbine-engine thrust-reverser specifically designed to withstand impacts possibly caused by objects propelled from the engines around which they are mounted, for instance disk or blade fragments. These impacts have the energy to distort the annular thrust-reverser structure or to break its bracing components. An emergency locking system for such thrust reverser (35) each comprises a hinging latch (38) of which one end is in the form of a hook (40) partly enclosing the lock-interfacing mechanism (43) with the latch (38) being automatically biased into closing by an elastic arrangement (47). Such a configuration allows setting up additional mechanical connections which are able to compensate for any distortion of the thrust-reverser's annular structure or for any ruptured bracing component in the event of impact by an engine piece.

18 Claims, 9 Drawing Sheets

THRUST REVERSER WITH IMPROVED IMPACT STRENGTH

BACKGROUND OF THE INVENTION

1. Field of the Invention

The invention relates to aircraft gas turbine engine thrust-reversers. More particularly, it relates to thrust reversers which are designed with particular attention to resist impacts from objects from the gas turbine engines around which they are configured.

2. Description of the Related Art

Aircraft thrust-reversers are well known equipment to reverse the direction of flow of the propellant gas generated by the gas turbine engine powering the aircraft in order to decelerate the aircraft.

The thrust reversers are in the form of an annular structure enclosing the gas turbine engine. This annular structure comprises a first portion, i.e., a fixed structure, which includes by a plurality of radial apertures and a second portion constituted by at least one displaceable shutter or door means to close the radial apertures. When the radial apertures are closed, the propellant gas flow generated by the gas turbine engine is channeled rearward to propel the aircraft in a forward direction. When the radial apertures are open, the propellant gas flow is directed through said apertures forwardly to decelerate the aircraft.

The shutters must be kept in the closed position with high reliability. Accordingly each shutter typically is held closed by at least one main locking system and by at least one reserve or emergency locking system designed to keep the shutter closed even in the event of main locking-system malfunction. The expression "locking system" denotes a lock mounted on part of the annular structure, the lock cooperating with a lock-interface means mounted on the other part of the annular structure. Usually, but not necessarily, the lock is mounted on the fixed structure and the lock-interface means is mounted on the shutter.

Most thrust reversers may be considered to be of two types. In one type, the shutters are mounted in pivotable manner in the radial apertures. In the second type, a single annular shutter encloses the fixed thrust-reverser structure and covers the radial apertures, the aperture opening being implemented by rearwardly translating the shutter.

The annular structure of the thrust reverser is radially bounded by two thin walls or skins, namely an inner wall channeling the propellant-gas flow and an outer wall against which the ambient air flows. These walls are interconnected by bracing or frame structure to achieve a lightweight and simultaneously rigid and structurally integral thrust reverser. Typically the locking systems are mounted on the bracing means of the fixed structure and the shutters.

Inherently, the fixed structure's framing is a complex structure. It comprises a first rigid ring or fore frame, a second rigid ring or rear frame and a plurality of longitudinal beam elements rigidly joined by their ends to the fore frame and to the rear frame, the radial apertures being configured between the longitudinal beams. Moreover, thrust reversers are known which lack a rear frame, the longitudinal doors consequently being affixed by their front ends to the fore frame while their rear ends remain free.

Though quite rare, gas turbine engine accidents may seriously damage the thrust reverser. Illustratively, a rotor blade, or even a rotor disk, may rupture. Due to the centrifugal force, the fragments thereof may impact the thrust reverser.

Damage so created may be limited to more or less localized deformation of the annular thrust-reverser structure and its bracing means. Nevertheless, such deformation may render a locking system inoperative because of the ensuing gap between the lock and the lock-interface means, possibly leading to the premature opening of the shutter. Therefore, a first problem is keeping the shutters closed despite the deformation of the annular thrust-reverser structure.

More serious yet, the damage may rupture a bracing element, in particular the fore frame, a longitudinal beam or the rear frame, whereupon the thrust reverser may no longer be structurally functional. Consequently, a second problem is precluding loss of thrust-reverser structural functionality in case of bracing-means rupture.

Monitoring the proper shutter locking is based on electric detection and signaling means combined with the mechanical components controlling locking. The signaling means also may malfunction or transmit spurious locking signals. A dangerous situation may ensue, which remains undetectable when the aircraft is on the ground and ready for takeoff, when the shutters are closed but unlocked. A third problem is reliably signaling to ground that the locking systems are closed.

SUMMARY OF THE INVENTION

The invention is an aircraft thrust-reverser, in particular in the form of an annular structure enclosing a gas turbine engine and wherein the annular structure includes a first or fixed structure which includes at least one ram aperture and at least one second displaceable portion or shutter to close/open the radial aperture(s). The thrust reverser is fitted with main shutter-locking means and at least one emergency locking means connecting the shutter to the fixed structure when the shutter is in the closed mode. This locking system comprises a lock rigidly affixed to part of the annular structure and a latch pivoting at one end on a hinge and cooperating at its other free end with a locking interface means rigidly joined to the other part. The emergency locking system also includes means driving the latch into opening, i.e., into the open mode.

Such a thrust reverser is unique in that it includes the following features:

(a) elastic means automatically returning the latch of the emergency locking systems into the closed mode;

(b) the free latch end comprises a hook in a plane perpendicular to the latch's hinge, the lock-interface means being able to move through the opening in the hook when the latch moves into its closed mode while the shutter is also closed; and (c) the hook partly encloses the lock-interface means when the latch is in the closed mode while the shutter is also closed.

It follows from the above that the elastic means maintain the latch near the lock-interface means which is partly enclosed by the hook. As a result of such a configuration, the latch keeps the lock-interface means in position relative to the lock regardless of the direction in which said interface means would tend to move in a plane perpendicular to the latch hinge due to warping of the annular structure or breaking of a brace means, because:

this retention is inherently implemented by the shape of the hook when the displacement direction of the lock-interface means and opposite the latch hinge subtends a shallow slope relative to an imaginery line extending from the hinge to said lock-interface means;

this retention is accompanied by a pivoting motion of the hook about the hinge when the displacement direction of the lock-interface means subtends a large angle relative to an imaginary line from the latch hinge to the lock-interface means, the angle however being palliated because of the hook's pivoting motion; and in extreme cases, the lock-interface means even may come near the hinge; however because the elastic means keep the latch near the lock-interface means, the hook remains capable of retaining the lock-interface means when it tends to again move away from the hinge.

Consequently, the invention makes it possible to keep the shutter in the closed mode despite a non-operational main locking means and despite warping of the annular structure or rupture of the bracing means. In the latter case, the present invention also creates additional linkages between the fixed structure and the shutters when the latch hooks hold back the lock-interface means; accordingly, in the event of warping of the annular structure or rupture of a bracing means, the shutters thus stressed will cooperate with the fixed structure to retain thrust-reverser structural functionality.

Moreover, the present invention offers high reliability and the advantage of being easily implemented.

Advantageously, the latch hinge-means are substantially orthogonal to the boundary line between the fixed structure and the shutter near the latch in order to oppose separation between shutter and fixed structure at this location.

Advantageously again, a clearance is present between the hook and the lock-interface means. As a result, any friction between the hook and the lock-interface means will be eliminated when the elastic latch return means act during the closing mode allowing the latch to be returned toward the closed position with reduced torque, making highly reliable the automatic and elastic bias of the latch in the closed mode.

Advantageously again, the lock-interfacing means comprises a pivoting roller to reduce friction with the hook when said lock-interfacing means is moving, thereby facilitating the pivoting motion of the latch on its hinge and reducing the required retention force.

Advantageously, the emergency locking systems are located within a wall radially bounding the thrust-reverser's annular structure. The latch hinge and the lock-interfacing means are substantially equidistant from the wall; that is, the theoretical line between the hinge and the lock-interfacing means is substantially parallel to this wall when the shutter is in the closed mode at that location. Consequently, the locking stress is experienced by the wall in a direction substantially tangent to this wall and hence additional links are created between the wall portion constituting the fixed structure and the wall portion constituting the shutter when the thrust-reverser's brace means are warped or ruptured, allowing this wall to maintain the thrust-reverser structural functionality and to counter thereby the weakening of the brace means. The emergency locking system may be directly linked to the wall or be linked to a brace means in turn liked to the wall.

Assuming D be the distance between the hinge and the lock-interface means and H be the distance from the hinge and from the lock-interfacing means to the wall's neutral axis, the ratio D/H must be at least 3 to reduce the wall-orthogonal component of the stress applied to the structure. A ratio of about 4 to 6 is preferred to make the component negligible. Reducing H and hence increasing D/H also allows reduction of the bending moment applied to the wall by the applied stress.

In the case of so-called "door" type thrust-reversers, advantageously at least one emergency locking system of the invention is mounted laterally at each radial door side. The set of the emergency locking systems are substantially oriented and aligned along a thrust-reverser periphery or circumference; that is, located in a transverse imaginary plane extending perpendicular to the gas-turbine engine-axis. The latch hinges consequently are substantially orthogonal to the circumference. Such a configuration moves the tensile locking stresses along this circumference. Because the thrust reverser essentially assumes the shape of a body of revolution about the gas turbine engine, this configuration is especially effective in that the wall radially bounding the thrust reverser experiences the locking stresses, thereby maintaining the thrust-reverser's structural functionality in spite of annular-structural warping or rupture of said structure's bracing means.

Advantageously again, the latch in its open mode projects in part from the wall radially bounding the thrust-reverser's annular structure which the latch abuts. Such a configuration renders the latch visible from outside the thrust-reverser's annular structure when said latch is in its open mode, and consequently allows visual monitoring from the ground that the emergency locking-systems are properly locked. Contrary to conventional locking detection and signaling devices, the present invention is simultaneously entirely reliable and simple and will not generate spurious signals.

In a preferred embodiment, the latch when in its closed mode does not project from the wall radially bounding the thrust-reversers'annular structure. This design masks the latch in this position and consequently allows more convenient "go/no-go" monitoring; that is, the latch is visible in its open mode and masked in its closed mode.

Advantageously as well, the locks each comprise a pawl keeping the latch in place in its open mode, said pawl being released by the lock-interfacing means when the shutter closes again. Because of the cooperation between this pawl and the elastic, automatic, latch-biasing means toward the closed mode, this configuration constrains the closing motion of the shutters to the motion of said locks, without using means external to the locks, and consequently it prevents in an especially reliable manner the closing of each lock as long as the corresponding shutter has not yet been closed. Such a configuration also offers the advantage of keeping the latches in their open mode in a very simple manner, without using external means.

BRIEF DESCRIPTION OF THE DRAWINGS

The invention and its advantages are elucidated in the following description of several detailed illustrative embodiments and the attached drawing, in which.

DETAILED DESCRIPTION OF THE PREFERRED EMBODIMENTS

Figure 1:
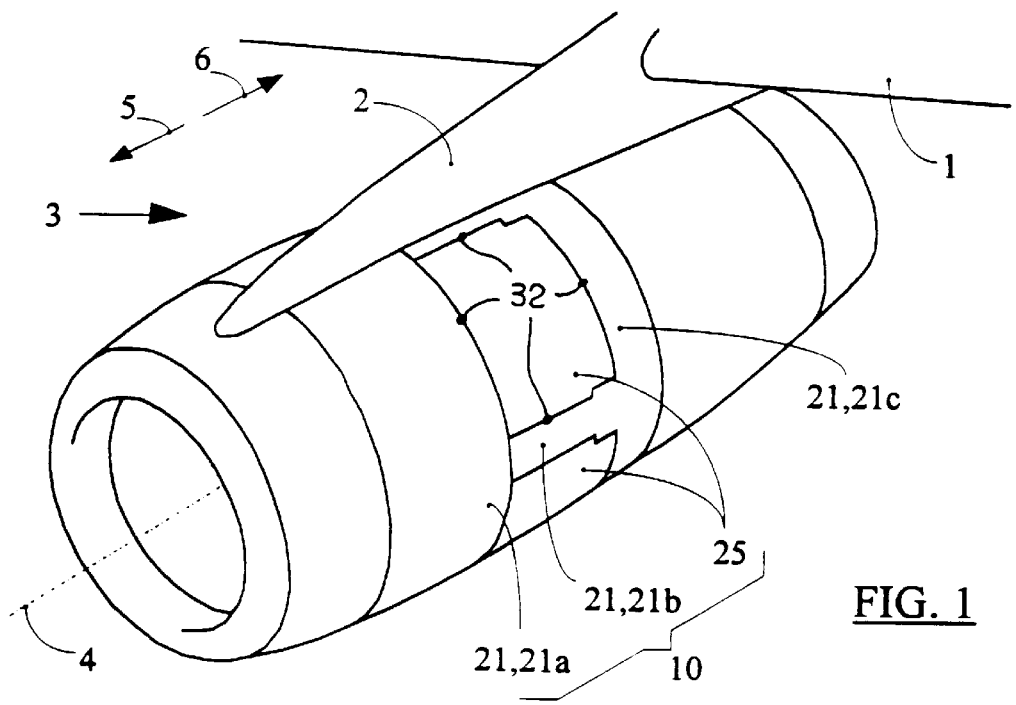
FIG. 1 illustrates a gas turbine engine pod shown in external view with a so-called "door" type pivoting-shutter thrust-reverser.

In FIG. 1, a pylon 2 underneath a wing 1 of an aircraft (not shown) supports a cowling 3 enclosing a gas-turbine engine (not shown) having an axis 4. The shape of the cowling 3 is substantially annular about the axis 4. The forward and rearward (aft) directions, respectively, are denoted by 5 and 6. The thrust reverser 10 is towards and constitutes the rear part of the cowling 3.

Figure 2:
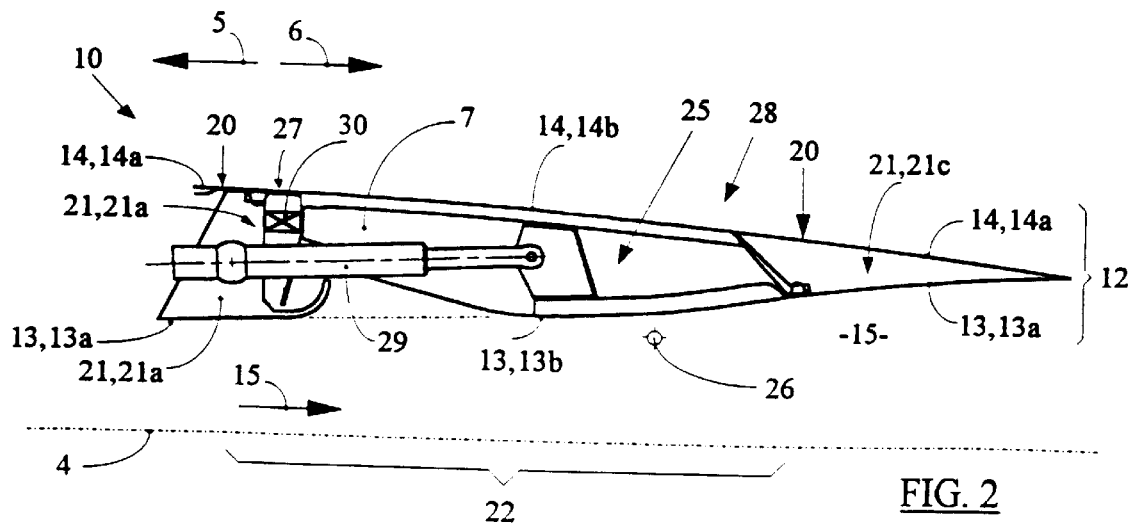
FIG. 2 is a schematic longitudinal section detail view of the same thrust reverser, the engine axis having been moved nearer the shown thrust-reverser part for clarity.

As shown in FIG. 2, the thrust reverser 10 comprises an annular structure 12 assuming substantially the shape of a body of revolution about the axis 4. The annular structure 12 is radially bounded by a thin inner wall 13 and by a thin outer wall 14. The inner wall 13 encloses and guides rearward 6 a propellant-gas flow 15 generated by a gas turbine engine.

Figure 6:
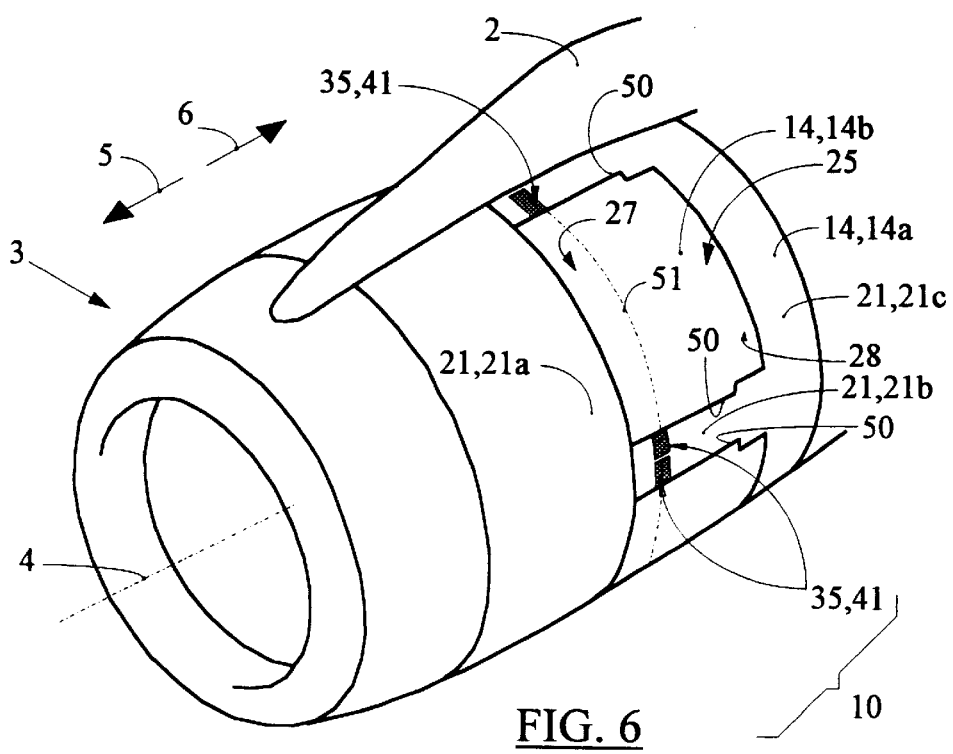
FIG. 6 shows an external view of a configuration of the emergency locking systems located at the sides of the doors and along a thrust-reverser circumference.
Figure 11:
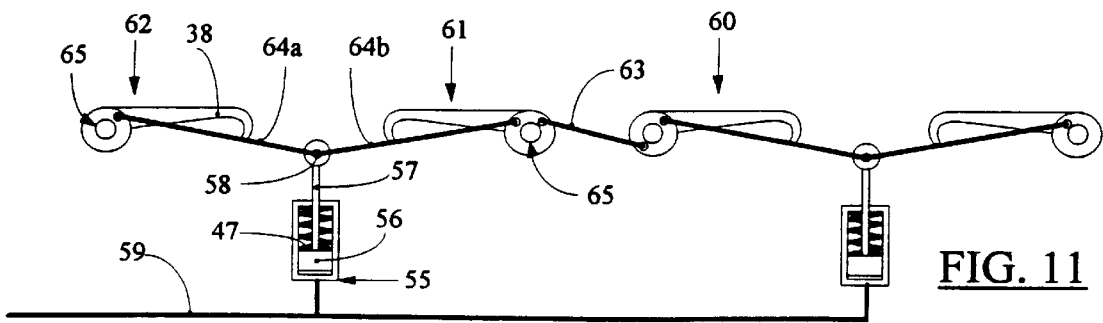
FIG. 11 shows schematically another synchronized and redundant control design of the emergency locking systems.

The annular structure 12 comprises a first portion 20 called the fixed (i.e., fixed) structure which in turn comprises a bracing means 21 rigidly affixed to fixed elements 13a and 14a of the walls 13 and 14. The bracing means 21 cooperates with the fixed elements 13a and 14a of the walls 13 and 14 to assure rigidity and structural functionality in the fixed structure 20. Typically the bracing means 21 is a fore frame 21a in the form of a ring centered on the axis 4, a plurality of longitudinal beams, denoted 21b in FIGS. 6 and 11, substantially parallel to the axis 4 and rigidly joined by their front ends to the fore frame 21a, and, in some types of thrust reversers, a rear frame 21c in the form of a ring centered on the axis 4. The longitudinal beams 21b of FIGS. 6 and 11 are substantially parallel to the axis 4 and firmly affixed by their front ends to the fore frame 21a and rigidly joined by their rear ends to the rear frame 21c, if any. In the event that the rear frame 21c is absent, the longitudinal beams 21b are held only by their front ends to the fore frame 21a. The fixed structure 20 furthermore comprises a plurality of radial apertures 22 configured between the fore frame 21a, the rear frame 21c and the longitudinal beams 21b. The annular structure 20 comprises at least a second portion consisting of displaceable shutters 25 to close the radial apertures 22. In this embodiment the shutters 25 are pivotable and are called "doors". Such shutters 25 typically are mounted on pivots 26 with the pivoting motion being a simple rotation on these pivots 26. These shutters 25 also may be mounted on a set of linkage rods (not shown) with the pivoting motion in that case being more complex but without effect on the present invention. The fore and rear parts of the shutter 25 are denoted by 27 and 28. The shutter is driven into opening and closing by control means 29 which in this example is a hydraulic linear actuator hinging at one end on the fore frame 21a and at its other end on the shutter 25. The parts of the walls 13 and 14 belonging to the fixed structure 20 are denoted by 13a and 14a, respectively. Furthermore, the parts of the walls 13 and 14 belonging to the shutter 25 are denoted by 13b and 14b. When the shutter 25 is in the closed position, the wall parts 13b and 14b on the shutter 25 are respectively aligned with the wall elements 13a, 14a on the fixed structure 20. The annular structure 12 of the thrust reverser 10 also comprises locking means 30 to keep the shutter 25 in its closed position without resort to the control means 29. These locking means 30 are usually, but not necessarily, mounted between the front part 27 of the shutter 25 and the fore frame 21a.

In FIG. 1, the boundary line between the fixed structure 20 and each shutter 25 is denoted by 32.

Figure 3:
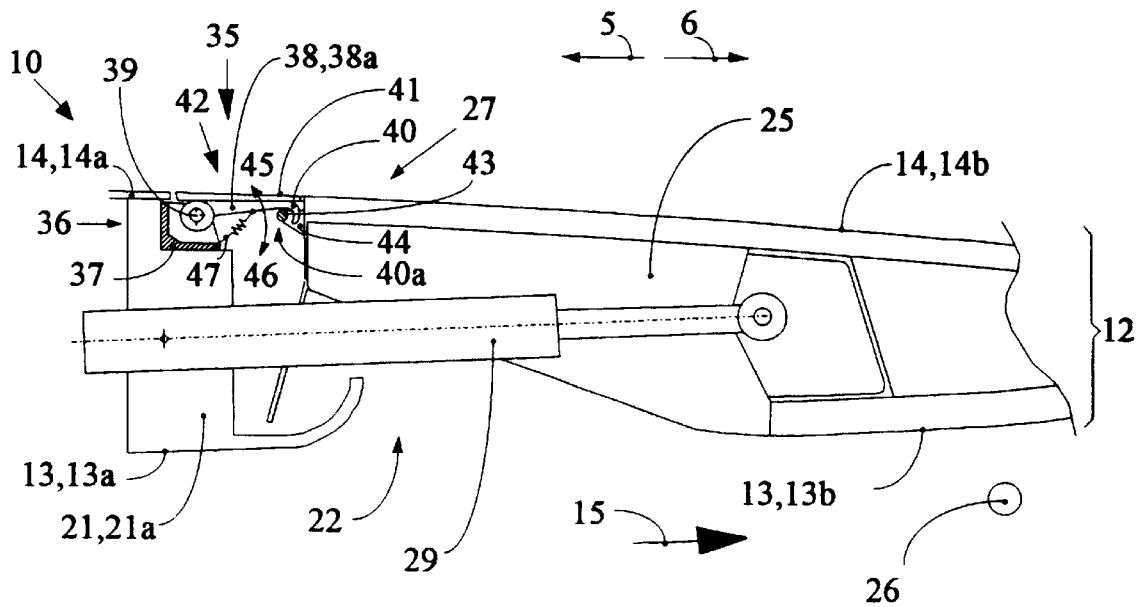
FIG. 3 shows a configuration of an emergency locking system in the closed mode in front of a pivoting shutter.
Figure 4:
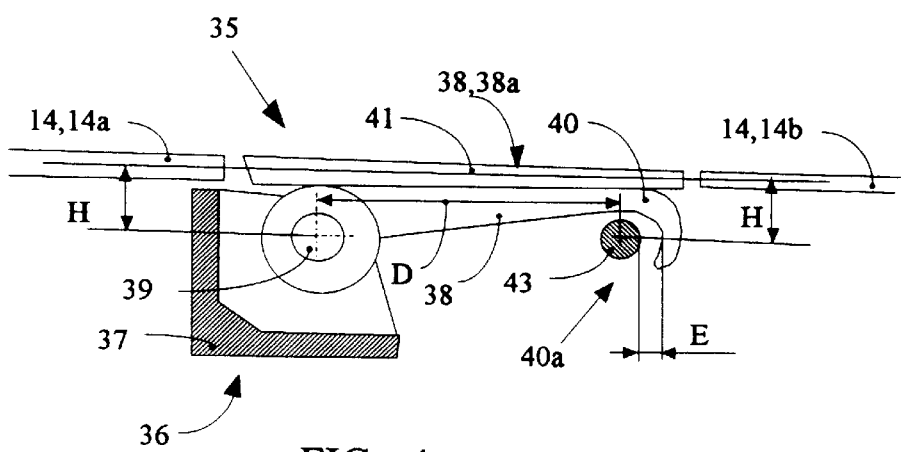
FIG. 4 shows an enlargement of the same locking system.

FIGS. 3 and 4 will now be considered simultaneously. The shutter 25 is in the closed position. In this embodiment, an emergency locking system 35 is mounted at the outer wall 14 between the fore frame 21a and the front end 27 of the shutter 25. The emergency locking system 35 comprises a lock 36 which in turn comprises a support 37 and an elongated latch 38 mounted at one end by a hinge 39 on the support 37 whereas the free end of the latch 38 comprises a hook 40 subtending a hook opening 40a. The latch 38 also comprises a cover 41 that fits inside an opening 42 in the outer wall 14. In this embodiment, the cover 41 is a simple plate. The emergency locking system 35 also comprises a lock-interfacing means 43 in this embodiment comprising a roller 43 kept in place by a bracket 44 at the front end 27 of the shutter 25. The opening and closing directions of latch 38 are respectively denoted by 45 and 46. Elastic and automatic return means 47 bias the latch 38 into the closed mode and automatically move the latch 38 into the vicinity of the lock-interfacing means 43.

Illustratively, the elastic and automatic return means comprise a spring 47 located between the latch 38 and the support 37 which acts as a tension spring in the manner shown in FIG. 3 or as a torsion spring if the spring encloses the hinge 39. Because the opening 40a of the hook 40 points in the closing direction 46 and toward the hinge 39, the hook 40 partly encloses the lock-interfacing means 43 with play or clearance E. In a closed mode 38a of the latch 38, the cover 41 is located in the opening 42 of the outer wall 14 and is aligned with this wall 14 to assure aerodynamic continuity.

It will be appreciated with respect to this position that due to the cooperation between the hook 40 and the elastic, automatic return means 47, despite any deformation of the annular structure 12, the latch 38 remains near the lock-interfacing means 43 the instant said means moves away from the hinge 39 within the clearance E.

Assuming D to be the distance between the hinge 39 of the latch 38 and the lock-interfacing means 43 cooperating with this latch 38 and assuming H to be the distance between both the hinge 39 and the lock-interfacing means 43 and the "neutral axis" of the outer wall 14 (the expression "neutral axis" being in the sense of "strength of materials" and substantially corresponding to a neutral bending or stress axis of the wall 14). In this instance, the ratio D/H is about 5. Therefore, in the event of accidentally unlocking of the shutter 25, or deformation or rupturing of the fore frame 21a the wall 14 will experience, at a reduced torque, part of the retention stress of the emergency locking system 35.

The latch 38 may directly abut the lock-interfacing means 43 or it might abut through the intermediary of the cover 41, a component of the shutter 25. In both cases, when in the closed mode 38a, the latch 38 driven by the automatic elastic return means 47 follows the displacement of the lock-interfacing means 43 and remains able to hold back the lock-interfacing means 43 when the latter moves away from the lock 36.

It is understood that closing and effectively locking the shutter 25 are externally visually displayed by the alignment of the parts 14a and 14b of the wall 14, relative to each other and to the cover 41.

Figure 5:
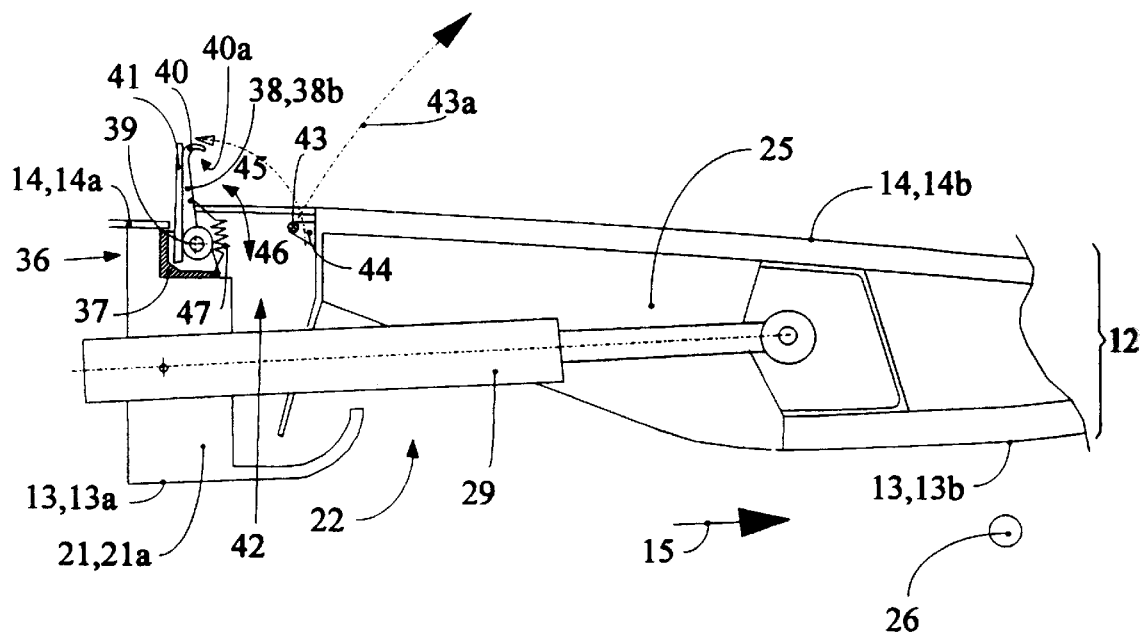
FIG. 5 shows the configuration of the same locking system in the open mode, the pivoting shutter being ajar.

In FIG. 5, the path followed by the lock-interfacing means 43 relative to the lock 36 when the shutter 25 is opening is denoted by 43a. The shutter 25 is ajar and the latch 38 is in the open mode 38b, partly projecting from the outer wall 14. It will be appreciated that in this mode 38b, the latch 38 is quite visible from the outside, displaying the unlocked state of the shutter 25.

In FIG. 6, a so-called "door" thrust reverser comprises a plurality of pivoting shutters 25 called "doors". A circumference 51 on the outer wall 14 and centered about the axis 4 lies in a radial plane perpendicular to said axis 4 and passes through the front end areas 27 of said shutters 25 as well as through the longitudinally extending sides 50 of said shutters 25. The emergency locking systems 35 together with their rectangular covers 41 are mounted on the sides 50 of the shutters 25, preferably nearer the front or rear parts 27 and 28 respectively. The emergency locking systems 35 furthermore are substantially aligned along the circumference 51. The expression "aligned" means that each latch 38 is substantially located on this circumference 51.

Figure 7:
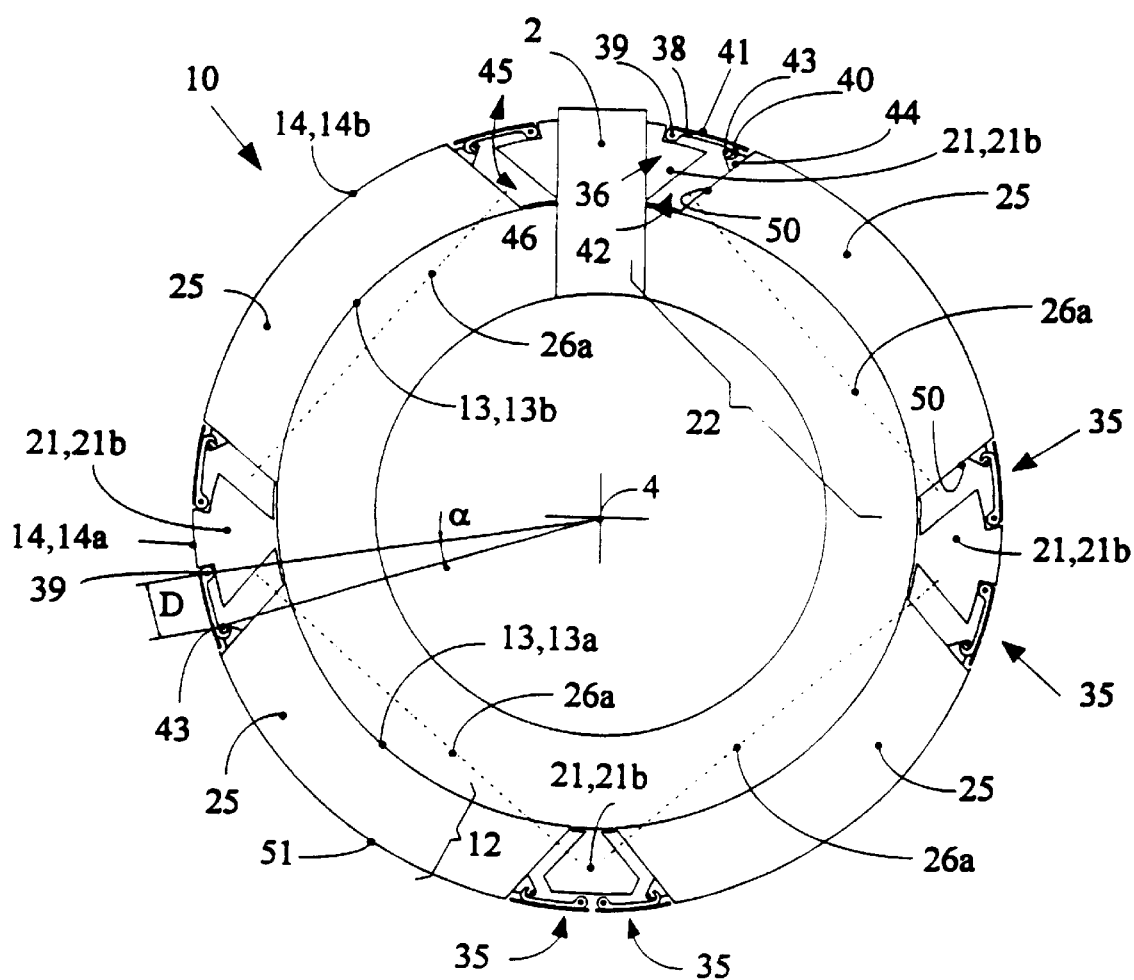
FIG. 7 shows schematically a cross-section of the emergency locking system configuration along the thrust-reverser's circumference.

In FIG. 7, the thrust reverser 10 is shown in cross-section at the circumference 51 of FIG. 6. The longitudinal beams 21 constituting the fixed structure also are shown cross-sectionally and are denoted by 21b. In this embodiment, the thrust reverser 10 has four shutters 25 pivoting about the axes 26a of the pivots 26 of FIGS. 2 through 4, where these axes 26a obviously are in a plane different from that of FIG. 7. Each shutter 25 is locked at each of its two radial sides 50 by a locking system 35 mounted at the outer wall 14 inside the annular structure 12. These eight emergency locking systems 35 are symmetrical.

The above defined D/H ratio is close to 5. Accordingly, in the event of accidental unlocking of the shutters 25, or deformation or rupturing of the annular structure 12, either in the fixed structure 20 or in a shutter 25, a continuous mechanical connection is formed on the outer wall 14 along the circumference 51 due to the cooperation of the outer wall 14b of the shutters 25, the outer wall 14a of the fixed structure 20 and the locking systems 35. The connection acts in a circle to preserve the structural functionality of the thrust reverser 10.

In order that the stress thus experienced by the outer wall 14 is substantially tangent to the outer wall 14, hence reducing the bending torque and the component of the stresses normal to the wall 14, the angle α subtended by the hinge 39 of the latch 38, the axis 4 and the lock-interfacing means 43 must be at most 15°. In the present example, the angle α is substantially equal to 8°.

Figure 8:
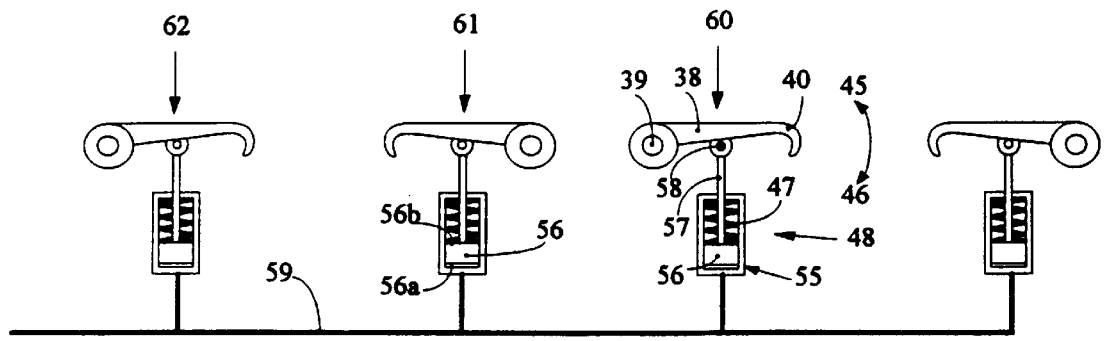
FIG. 8 shows schematically a synchronized and redundant control design of the emergency locking systems.

In FIG. 8, the means 48 driving the latches 38 into the open mode are synchronized for the set of emergency locking systems of which, in FIGS. 8 through 11, only the latches 38 are shown. These drive-to-open means 48 comprise one hydraulic linear actuator 55 per latch 38. Each actuator 55 is mounted on the side of the closing direction 46 of the latch 38. The piston 56 of each linear actuator 55 is connected by a rod 57 and a hinge 58 to a latch 38. A common hydraulic circuit 59 feeding each linear actuator 55 is located on the side 56a of that piston 56 which is opposite the latch 38, thus allowing the latch 38 to be pushed in the direction opposite to the opening direction 45. The elastic automatic return means 47 comprises a helical spring compressed inside each linear actuator 55. The spring acts on the side 56b of the piston 56 facing the latch 38 and allows automatically pulling of the latch 38 in the closing direction 46 by the piston 56, the rod 57 and the hinge 58 connecting the rod 57 to the latch 38 as soon as the fluid pressure in the hydraulic circuit 59 drops. In other words, the force of the spring opposes that of the fluid in the hydraulic circuit 59. This design offers the advantage of simplicity by combining the closing and opening drive means into a single mechanism.

Figure 9:
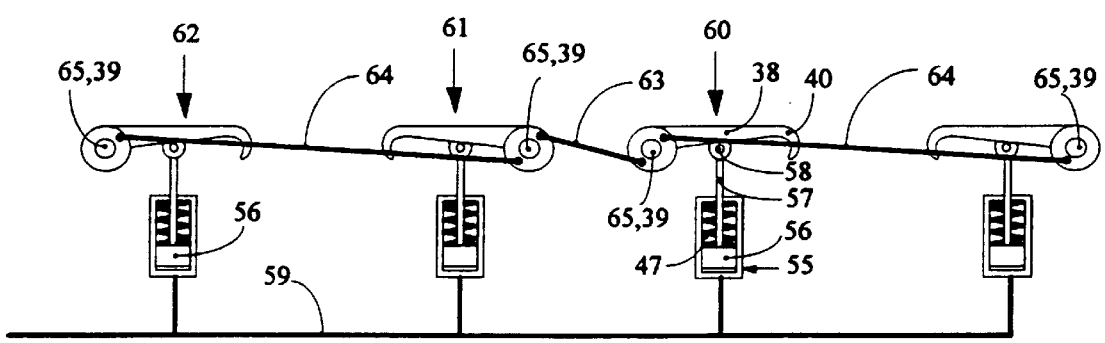
FIG. 9 shows schematically a synchronized and redundant control design of the emergency locking systems.

In FIG. 9, the emergency locking systems 60 and 61 are mounted on the same longitudinal beam denoted 21b in FIG. 7 and the emergency locking systems 61 and 62 drive the same shutter denoted 25 in FIG. 7.

In order to circumvent the malfunction of an automatic elastic return means 47 or drive-to-open means 48, the control of the emergency locking systems 60, 61 and 62 is made redundant by introducing additional mechanical drives linking the latches 38 and allowing the malfunctioning emergency locking system to be driven by the motion of at least one of two adjacent emergency locking systems. Thus, two emergency locking systems 60, 61 on one longitudinal beam are coupled by an additional drive means 63 which illustratively is a linkage rod 63 hinging on each latch 38. Again, two emergency locking systems 61, 62 driving a given shutter are coupled by an additional drive means 64. In the former embodiment, the latches 38 each are rigidly affixed to an inner, pivoting shaft 65 implementing the function of the hinge 39 and the pivoting shafts 65 run as far as the fore frame 21a where they are coupled by a rod 64. In a preferred embodiment, the additional drive means 64 comprises a ball cable.

Figure 10:
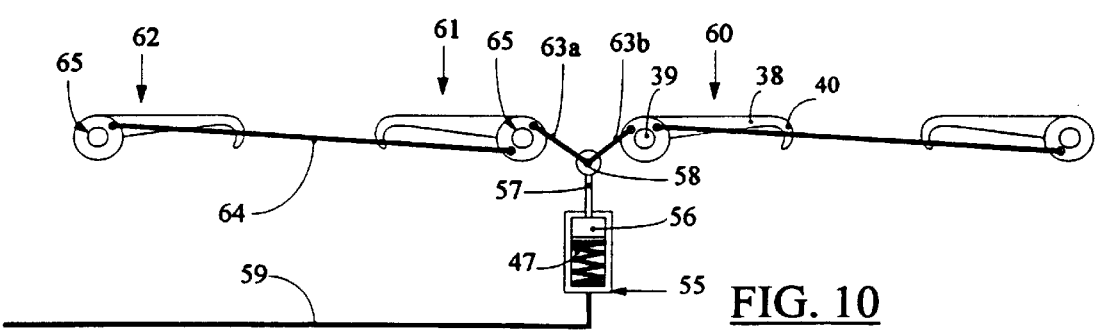
FIG. 10 shows schematically another synchronized control design of the emergency locking systems.

In FIG. 10, a single linear actuator 55 controls two emergency locking systems 60, 61 on one longitudinal beam by two linkage rods 63a, 63b.

In FIG. 11, a single linear actuator 55 controls two emergency locking systems 61, 62 each on each of the two radial sides of one shutter by two additional drives 64a, 64b.

Figure 12:
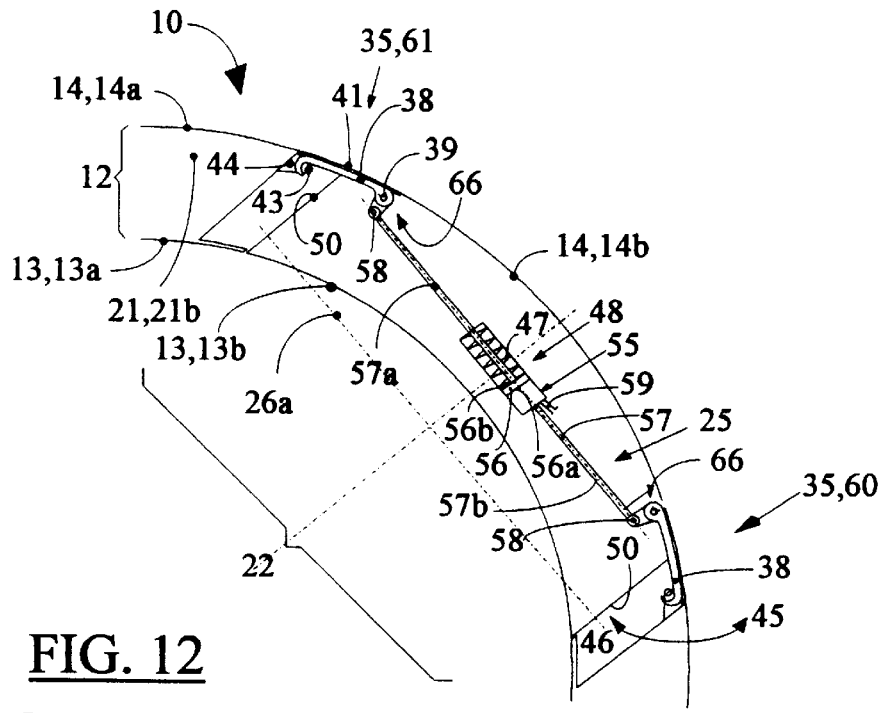
FIG. 12 shows an illustrative cross-section of a configuration and synchronized control of two locking systems on the sides of a door.

In FIG. 12, one emergency locking system 35 connects each of the two radial sides 50 of a shutter 25 to the adjacent longitudinal beams 21b, with the latches 38 hinging on the shutters 25 and being configured substantially along a circumference 51. The two latches 38 on one shutter 25 are controlled by a single linear actuator 55 with the piston 56 connected to one of the latches 38 by a first rod 57a and the (unreferenced) piston case connected by a second rod 57b to the other latch 38. The actuator 55 and the rods 57a and 57b are housed inside the shutter 25. This configuration offers the advantage of using only one linear actuator 55 for two emergency locking systems 35 relating to one shutter 25 and making use of the inside volume, ordinarily empty, of the shutter 25.

Figure 13:
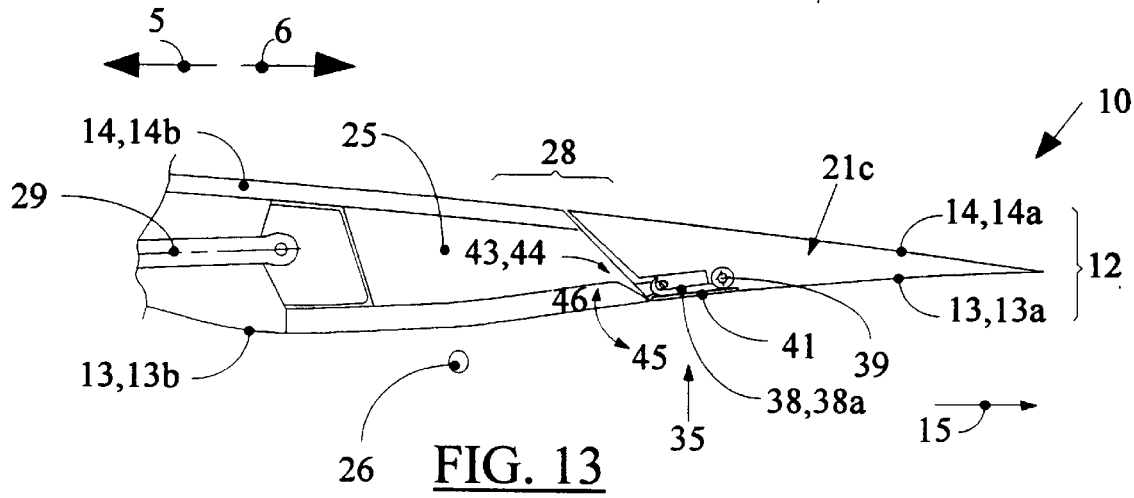
FIG. 13 shows an illustrative longitudinal section of a configuration of a locking system to the rear of a door, the lock being mounted on the rear frame.

In FIG. 13, the embodiment comprises an emergency locking system 35 configured between the rear end 28 of the shutter 25 and the rear frame 21c against the inner wall 13. The latch 38 is hinged on the rear frame 21c and the lock-interfacing means 43 is mounted on the rear end 28 of the shutter 25. When the latch is in the open mode, it projects from the inner wall 13 and is visible from the rear 6 of the thrust reverser 10.

Figure 14:
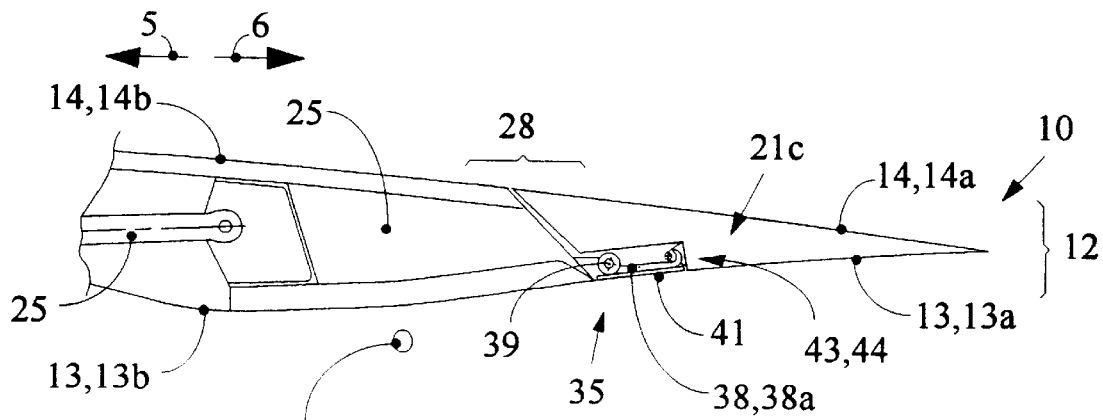
FIG. 14 shows an illustrative longitudinal section of the same locking system, the lock being mounted to the rear of the door.

FIG. 14 shows an embodiment which is the reciprocal of that of FIG. 13. The latch 38 is hinged on the rear end 28 of the shutter 25 and the lock-interfacing means 43 is mounted on the rear frame 21c.

Figure 15:
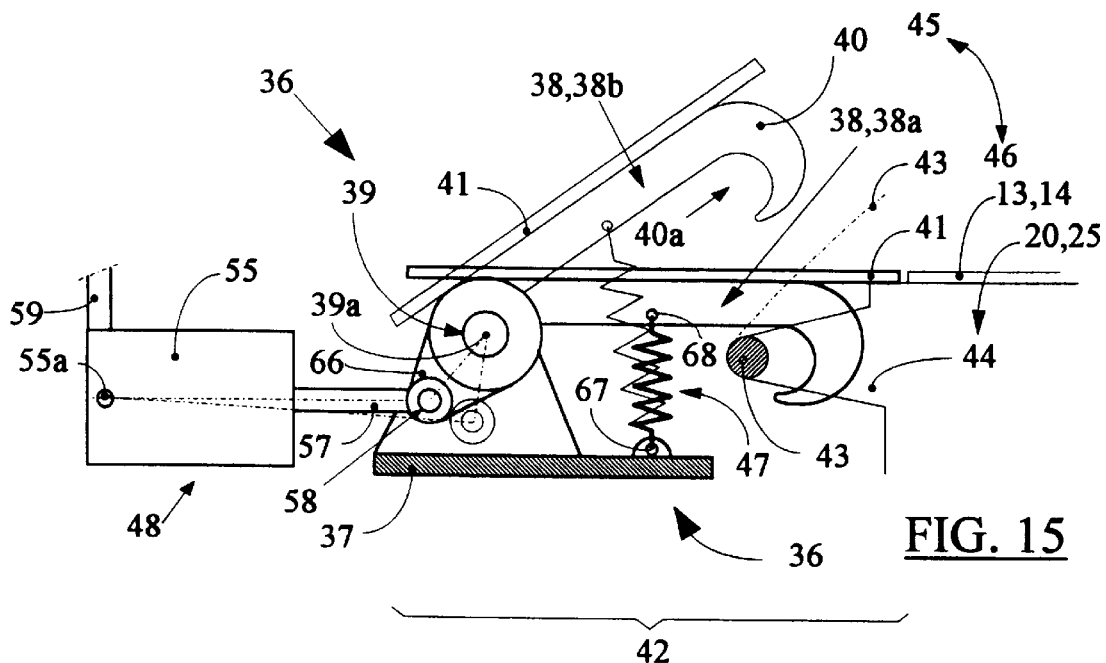
FIG. 15 illustrates a locking system together with its elastic means acting on the latch biasing it toward its closed position.

In FIG. 15, the latch 38 is shown both in the closed mode 38a and in the open mode 38b. In one embodiment of the invention, the latch 38 is connected by the hinge 39 to the support 37 and the aperture 40a of the hook 40 at the end of the latch 38 opposite the hinge 39 faces this support 37. The elastic and automatic means 47 biasing the latch 38 toward the closed mode comprises a tension helical spring of which one end 67 is connected to the support 37 and the other end 68 is connected to the latch 38. When the latch 38 is in the closed mode, the cover 41 comes to rest against the part 25, 20 of the annular structure 12 supporting the lock-interfacing means 43 and is aligned with the wall 13, 14 radially bounding the annular structure 12. The drive-to-open means 48 driving the latch 38 into the open mode comprises a linear actuator 55 pushing the latch 38 into its opening direction 45 by the rod 57 linked by the hinge 58 to a lever 66 itself solidly joined to the latch 38 to drive it into rotation. The linear actuator 55 in turn is connected by a hinge 55a to the part 20, 25 of the annular structure 12 supporting the support 37 or to the support 37 itself which may be extended for that purpose as far as the actuator 55. The actuator 55, the lever 66 and the latch 38 move in one plane. In other words, the hinge 55a of the linear actuator 55 and the hinge 58 connecting the rod 57 to the lever 66 run parallel to the hinge 39 connecting the latch 38 to the support 37. It will be understood that when the linear actuator 55 is not driven, the spring pulls on the latch 38 in the closing direction 46 until said latch come to rest against the part 25, 20 of the annular structure 12 supporting the lock-interfacing means 43. The linear actuator 55 may be hydraulic with the lock 36 being kept open by keeping the actuator 55 pressurized. The linear actuator 55 also may be electrical. In the latter case, the lock 36 will be kept open either by keeping the actuator 55 electrically energized or by using an electrically controlled brake (not shown) which may be inside the linear actuator 55.

Figure 16:
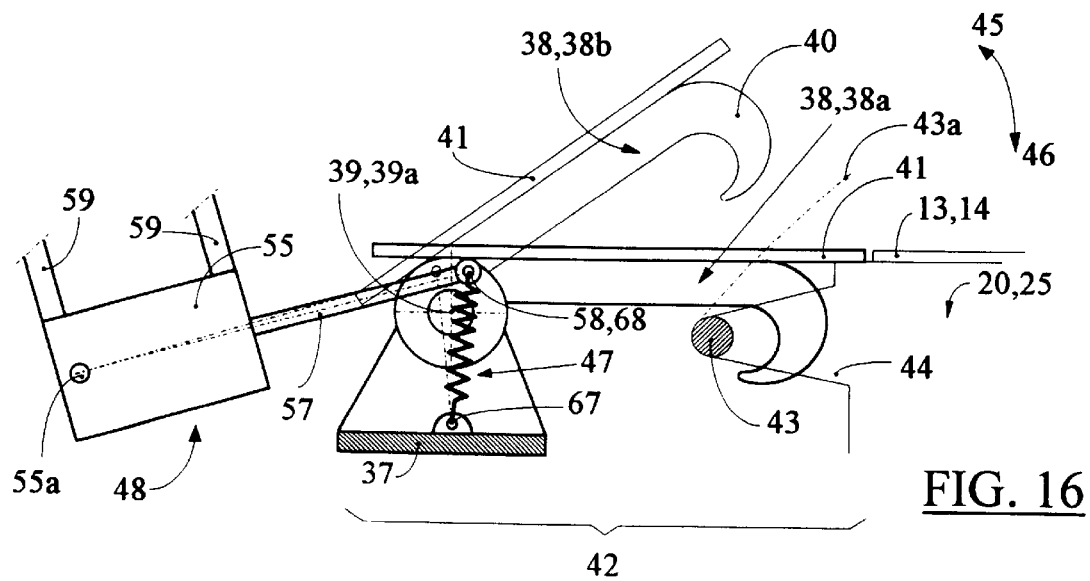
FIG. 16 illustrates the same locking system, the elastic means biasing the latch toward its closed mode assuming also a pivoting function.

In the embodiment shown in FIG. 16, only the following components differ from the previous embodiment. The elastic automatic return means 47 comprises a pivoting system to drive the latch in the closing direction 46 when it approaches the closed mode 38a and to drive the latch 38 in the opening direction 45 when it approaches the open mode 38b. In this instance, the linear actuator 55 is double-acting; that is, it can drive the latch 38 in opening or closing directions 45 or 46. With such a design, when closed, the lock 36 behaves as in the above embodiment; but, it remains open on its own, making it possible to release the linear actuator 55 without the need of any braking system. The designer may easily implement this pivoting effect by positioning the ends 67 and 68 of the spring in relation to the axis 39a of the hinge 39 connecting the latch 38 to the support 37.

In the embodiment of FIG. 16, the end 68 of the spring is connected to the hinge 58 linking the rod 57 to the latch 38 with the position of the hinge 58 having been selected for that purpose.

Figure 17:
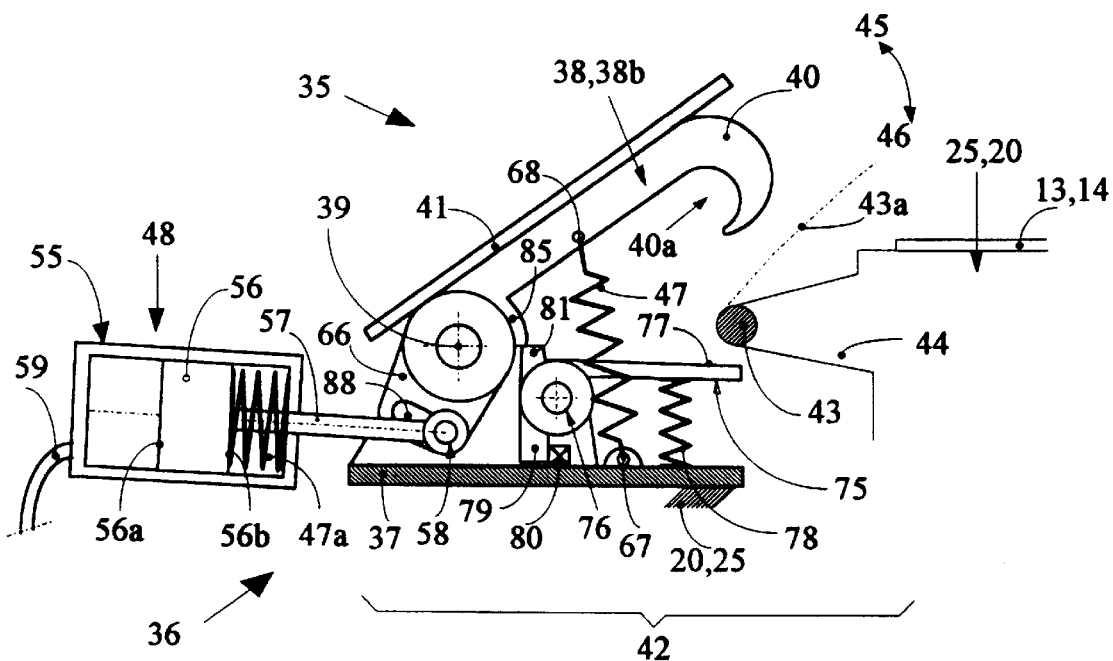
FIG. 17 illustrates an emergency locking system in its open position with a release integrated into the shutter closure.
Figure 18:
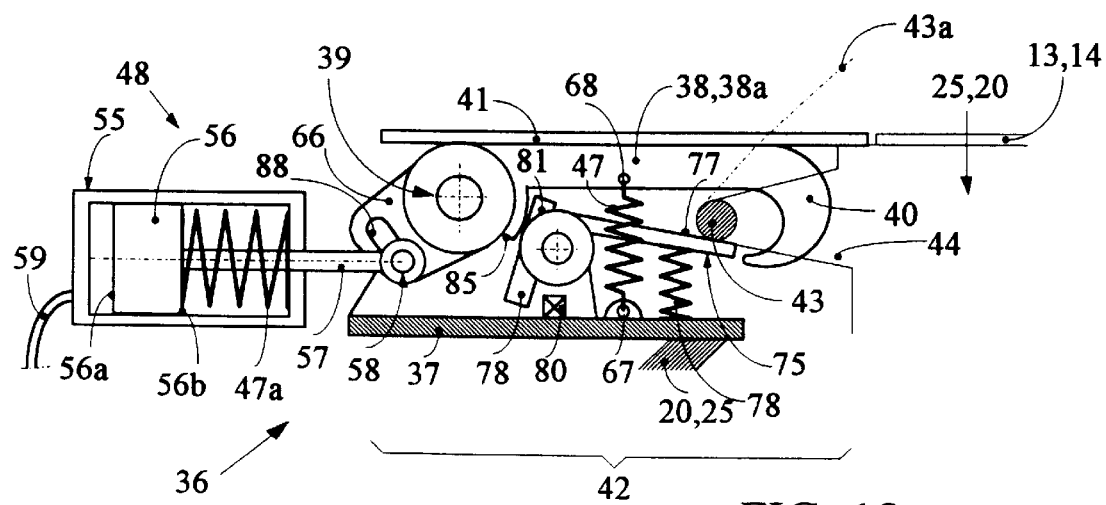
FIG. 18 illustrates the same emergency locking system in its closed mode.

In FIG. 17, the lock 36 is open and in FIG. 18, it is closed. In a preferred embodiment, the lock 36 is identical with that of the above embodiments of FIGS. 14 or 15; however, it does include the following additional components: a pawl 75 linked by a hinge 76 to the support 37. This pawl 75 comprises a rest surface 77 which is subjected to the pressure of the lock-interface means 43 when the shutter 25 closes. The pawl 75 is then repelled by a spring 78 toward the lock-interfacing means 43, whereby it is made to pivot automatically toward the lock-interfacing means 43 until it comes to rest, for instance until a stud 79 rigidly joined to the pawl 75 makes contact with a position stop 80 mounted on the support 37, with the pawl 75 fixed in this waiting position. The pawl 75 also comprises a retractable stop 81 which may serve as a rest to a mating stop 85 rigidly affixed to the latch 38 when the pawl 75 is in the waiting position and when the latch 38 is in the open mode and pulled by the spring in the closing direction 46 whereby the latch 38 is kept in the open mode. Lastly, the latch 38 is driven by the linear actuator 55 through the lever 66 rigidly affixed to the latch 38. The rod 57 is affixed to the piston 56 of the actuator 55 and connected by the hinge 58 to the lever 66. The piston 56 is subjected to the pressure of the hydraulic circuit 59 at its side 56a opposite the latch 38 in order to drive the latch 38 into the open mode and is subjected at its other side 56b to the thrust of the spring 47a supplementing the automatic elastic return means 47 of the latch 38. The hinge 58 connecting the rod 57 to the lever 66 in turn comprises a play illustratively produced by the sliding motion of the hinge 58 inside a slot 88 in the end of the lever 66.

The emergency locking system 35 operates as follows, starting from an "armed" position of the lock 36: when the lock 36 is "warmed", the pawl 75 is in the waiting position illustrated in FIG. 17 with the stud 79 resting against the position stop 80 and the latch 38 being in the open mode 38b with its mating stop 85 resting against the retractable stop 81 of the pawl 75 due to the tension from the spring.

The closing operation is as follows: when the shutter 25 closes, the lock-interfacing means 43 presses against the pawl 75, whereby the pawl pivots and the retractable stop 81 is displaced away from the mating stop 85 of the latch 38. As a consequence, the latch 38 is released and moves in the closing direction 46 due to the action of the spring and partly encloses the lock-interfacing means 43 by its hook 40. This automatic closing motion is made easier because the spring 47a in the linear actuator 55 already has pushed back the piston 56, thanks to the presence of the slot 88 allowing the hinge 58 connecting the rod 57 to the lever 66 to slide therein.

The opening operation is as follows: due to the pressure of the hydraulic circuit 59, the piston 56 pushes the latch 38 in the opening direction 45 beyond its open-mode position 38b. When the shutter 25 begins to open, the lock-interfacing means 34 moves away from the pawl 75 which, due to the thrust by the spring 78, pivots toward its waiting position. As soon as the pressure drops in the hydraulic circuit 59, the latch 38 pivots in the closing direction 46 until the mating stop 85 on the latch 38 makes contact with the retractable stop 81. The lock 36 is now kept "armed" and open and it remains in this state as long as the lock-interfacing means 43 does not come to rest against the pawl 75.

Figure 19:
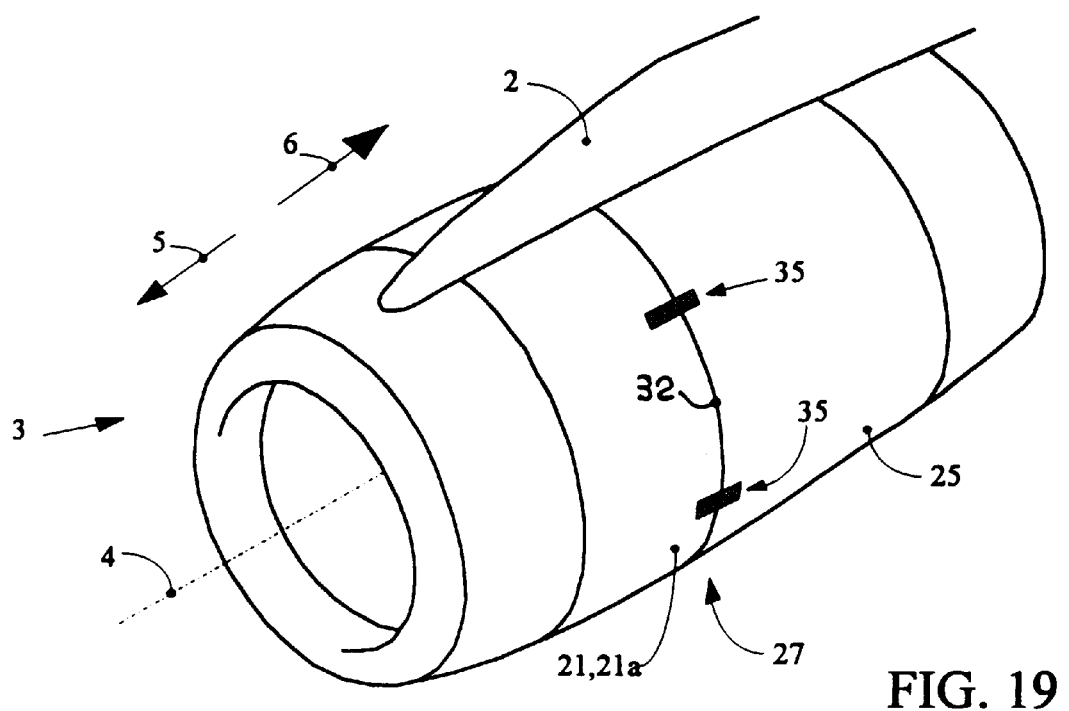
FIG. 19 illustrates a configuration of the emergency locking systems of a "cascade" type thrust-reverser.

In FIG. 19, the thrust reverser 10 is a "cascade" type and comprises an annular shutter 25, shown here in its closed position and thereby masking the radial apertures denoted 22 in FIGS. 3, 4 and 11, 12, 13. Contrary to the case of the pivoting shutters described above, the shutter 25 herein is opened by a rearward translation 6 and is closed by a forward translation 5 until abutting the fore frame 21a by its front part 27 where locking reliability is implemented by a plurality of emergency locking systems 35 distributed along the periphery of the fore frame 21a and shutter 25. The latches (not shown) are substantially parallel to the axis 4 of the cowling 3. If the emergency locking systems 35 are fitted with pawls 75 as in the above embodiment of FIGS. 16 and 17, the rest surface 77 need only be shifted by 90° to allow the pawl 75 to initiate the closure of the latch 38 and the lock-interfacing means 43 in this instance will follow a path 43a substantially parallel to the latch.

The present invention is not restricted to the above described embodiments, but on the contrary covers all variations that might be introduced without departing from the spirit or scope of the invention.

For example, it will be appreciated that the lock 36 is typically mounted on the fixed structure 20 to overall simplify the drive-to-open means 48 of the latch 38 in the open mode; however, this latch 36 also can be mounted on the shutter 25 as indicated in the embodiments of FIGS. 11 and 13.

The emergency locking systems 35 need not necessarily abut the outside wall 14 radially bounding the annular structure 12 of the thrust reverser 10; they also may be mounted abutting the inner wall 13. The latter configuration is indeed advantageous when the emergency locking systems 35 are mounted on the longitudinal sides 50 of the shutters 25 on the circumference 51 of this inner wall 13 so that latter can better react the holding stress due to its smaller radius of curvature.

Moreover, the aperture 40a of the hook 40 also face the wall 13, 14 abutted by the emergency locking system 35. While such a configuration is not mandatory, it is preferable in the case of emergency locking systems 35 which are pivotably mounted on the outer wall 14 at the rear portion 28 of the pivoting shutters 25 or on he inner wall 13 at the fore part 27 of these shutters 25. When in the open mode 38a, the latch 38 is made externally visible by the extension of its end opposite the hook 40 beyond the hinge 39.

As regards a variation of the drive-to-open means 48, the linear actuators 55 may be electrical and, illustratively, may comprise in a well known conventional manner an electric motor rotatably driving a ballscrew which in turn translationally drives a nut equivalent to the piston 56. The nut is connected to the rod 57 which is tubular and has a diameter sufficient to pass the ballscrew. The spring is mounted in the same manner inside the linear actuator and presses against the nut in the closing direction 46. The set of linear actuators 55 is controlled by an electric circuit equivalent to the hydraulic circuit 59. Such electric actuators combined with the springs and the common electric circuit represent an equivalent design solution because the means used therein implement substantially the same functions to achieve a similar result.

We claim:

1. An aircraft thrust-reverser with improved impact strength, comprising:

an annular structure (12) enclosing a gas turbine engine, said annular structure (12) including a fixed structure (20) and at least one displaceable structure (25);

at least one aperture (22) in said fixed structure (20), said at least one aperture (22) being closeable by said at least one displaceable structure (25) in a closed position;

at least one main locking system for keeping said at least one displaceable structure (25) in said closed position;

at least one emergency locking system (35) for keeping said at least one displaceable structure (25) in said closed position, said emergency locking system (35) including a lock (36) rigidly affixed to one part (20, 25) of said annular structure (12) and a lock-interfacing means (43) rigidly joined to the other part (20, 25) of said annular structure (12), said lock (36) including a latch (38) which is pivotable by a hinge (39) connected to said one part (20, 25) of said annular structure (12) and which cooperates with said lock-interfacing means (43), said latch (38) having a free end including a hook (40) lying in a plane extending perpendicular to said hinge (39) of said latch (38), said hook (40) defining a hook opening (40a), said lock-interfacing means (43) being extendable through said hook opening (40a) when said latch (38) moves into a closed mode (38a) while said at least one displaceable structure (25) is also closed, said hook (40) partly enclosing said lock-interfacing means (43) when said latch (38) is in said closed mode (38a) while said at least one displaceable structure (25) is also closed, said emergency locking system (35) also including a drive-to-open actuator (48) arranged to drive said latch (38) to an open mode; and an elastic means (47) connected to said latch (38) of said emergency locking system (35), said elastic means (47) being arranged so as to continuously bias said latch (38) into said closed mode (38a) and to keep said latch (38) by said lock interfacing means (43) regardless of any direction in which said lock-interfacing means (43) moves in a plane perpendicular to said hinge (39) of said latch (38).

2. An aircraft thrust reverser according to claim 1, wherein said fixed structure (20) and said at least one displaceable structure (25) define a set of boundary lines (32) therebetween when said at least one displaceable structure (25) is in said closed position, said latch (38) being positioned substantially orthogonal to a radial plane passing through one of said boundary lines (32) in a vicinity of said latch (38) so as to oppose mutual distancing between said at least one displaceable structure (25) and said fixed structure (20) at said vicinity.

3. An aircraft thrust reverser according to claim 1, wherein a clearance (E) is provided between said hook (40) and said lock-interfacing means (43) when said at least one displaceable structure (25) is locked in said closed position by said at least one main locking system to minimize friction therebetween when said elastic means (47) of said latch (38) operates towards said closed mode (38a).

4. An aircraft thrust reverser according to claim 1, wherein said lock-interfacing means (43) comprises a pivotable roller to minimize friction against said hook (40) when said lock-interfacing means (43) moves.

5. An aircraft thrust reverser according to claim 1, wherein said annular structure (12) of said thrust reverser is radially bounded by a pair of walls (13, 14), said emergency locking system (35) abutting one of said walls (13, 14), said hinge (39) of said latch(38) and said hook (40) of said latch (38) being substantially equidistant from said one of said walls (13, 14) so that locking stresses are experienced by said one of said walls (13, 14) in a direction substantially tangent to said one of said walls (13, 14).

6. An aircraft thrust reverser according to claim 5, wherein a first distance (D) between said hinge (39) of said latch (38) and the lock-interfacing means (43) and a second distance (H) between both said hinge (39) of said latch (38)

and said lock-interfacing means (43) and a neutral axis of said one of said walls (13, 14) are related to each other such that a ratio D/H is at least 3 to thereby reduce the bending moment and the normal component of stresses applied to said one of said walls (13, 14).

7. An aircraft thrust reverser according to claim 6, wherein said latch (38) when in said open mode (38b) projects from said one of said walls (13, 14) of aid annular structure (12) such that said latch (38) is visible from outside said thrust reverser (10).

8. An aircraft thrust reverser according to claim 7, wherein said latch (38) when in said closed mode (38a) does not project from said one of said walls (13, 14) of said annular structure (12).

9. An aircraft thrust reverser according to claim 8, further comprising:
   a cover (41) covering said latch (38), said cover (41) being aligned with said one of said walls (13, 14) when said latch is in said closed mode (38a) to provide aerodynamic continuity of said one of said walls (13, 14).

10. An aircraft thrust reverser according to claim 5, wherein said latch (38) when in said open mode (38b) projects from said one of said walls (13, 14) of said annular structure (12) such that said latch (38) is visible from outside said thrust reverser (10).

11. An aircraft thrust reverser according to claim 10, wherein said latch (38) when in said closed mode (38a) does not project from said one of said walls (13, 14) of said annular structure (12).

12. An aircraft thrust reverser according to claim 11, further comprising:
   a cover (41) covering said latch (38), said cover (41) being aligned with said one of said walls (13, 14) when said latch is in said closed mode (38a) to provide aerodynamic continuity of said one of said walls (13, 14).

13. An aircraft thrust reverser according to claim 5, wherein said at least one displaceable structure (25) of said annular structure (12) comprises a plurality of pivotable shutters (25) which are intersected by at least one circumference (51) which is centered on an axis (4) of said gas turbine engine and situated in a plane perpendicular to said axis (4), said shutters (25) each having two longitudinal sides (50) with at least one said emergency locking system (35) mounted on each of said sides (50), said emergency locking systems being substantially aligned along said circumference (51) to form a continuous mechanical connection on said one of said walls (13, 14) along said circumference (51).

14. An aircraft thrust reverser according to claim 1, wherein said at least one emergency locking system comprises a plurality of emergency locking systems, the thrust reverser further comprising:
   a plurality of hydraulic linear actuator (48) supplied hydraulically by at least one hydraulic circuit (59) which drive each of said emergency locking systems (35) in an opening direction (45), wherein said elastic means (47) include a spring disposed inside each of said hydraulic linear actuators (48), said spring opposing a force exerted by a fluid of said at least one hydraulic circuit (59).

15. An aircraft thrust reverser according to claim 14, wherein said hydraulic linear actuators (48) are fed from a common hydraulic circuit (59) to synchronize the motions of said latches (38).

16. An aircraft thrust reverser according to claim 15, further comprising:
   mechanical drive actuators (63, 64, 65) connecting said latches (38) to one another and arranged to drive a malfunctioning emergency locking system (35) by the motion of at least one adjacent emergency locking system (35), wherein said least one displaceable structure (25) of said annular structure (12) comprises a plurality of pivotable shutters (25) with longitudinal sides (50), said emergency locking systems (35) being located on said sides (50).

17. An aircraft thrust reverser according to claim 15, wherein said at least one displaceable structure (25) of said annular structure (12) comprises a plurality of pivotable shutters (25) with longitudinal sides (50), said latches (38) hinging on said shutters (25); and
   wherein two of said latches (38) hinging on one of said shutters (25) are controlled by a single linear actuator (48), said single linear actuator having a piston (56) linked to one of said two latches (38) and a case linked to the other of said two latches (38).

18. An aircraft thrust reverser according to claim 1, wherein said lock (36) includes a pawl (75) which keeps said latch (38) in said open mode (38b), said pawl (75) being releasable by said lock-interfacing means (43) when said at least one displaceable structure (25) closes so that moving said latch (38) into said closed mode (38a) is constrained to the closing of said at least one displaceable structure (25).

* * * * *

UNITED STATES PATENT AND TRADEMARK OFFICE
CERTIFICATE OF CORRECTION

PATENT NO.    : 6,045,091
DATED         : April 4, 2000
INVENTOR(S)   : Baudu et al.

It is certified that error appears in the above-identified patent and that said Letters Patent is hereby corrected as shown below:

COLUMN 2
Line 30, change "ram" to --radial--.

COLUMN 3
Line 55, change "liked" to --linked--.

COLUMN 6
Line 52, delete "47"

COLUMN 10
Line 36, change " "warmed," " to --"armed",--

COLUMN 11
Line 39, change "he" to --the--

UNITED STATES PATENT AND TRADEMARK OFFICE
CERTIFICATE OF CORRECTION

PATENT NO. : 6,045,091
DATED : April 4, 2000
INVENTOR(S) : Baudu et al.

It is certified that error appears in the above-identified patent and that said Letters Patent is hereby corrected as shown below:

<u>COLUMN 13</u>
Line 7, change "aid" to --said--

Signed and Sealed this

Twelfth Day of June, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,045,091
DATED : April 4, 2000
INVENTOR(S) : Baudu et al.

It is certified that error appears in the above-identified patent and that said Letters Patent is hereby corrected as shown below:

COLUMN 2
Line 30, change "ram" to --radial--.

COLUMN 3
Line 55, change "liked" to --linked--.

COLUMN 6
Line 52, delete "47"

COLUMN 10
Line 36, change " "warmed," " to --"armed",--

COLUMN 11
Line 39, change "he" to --the--

UNITED STATES PATENT AND TRADEMARK OFFICE
CERTIFICATE OF CORRECTION

PATENT NO. : 6,045,091
DATED : April 4, 2000
INVENTOR(S) : Baudu et al.

Page 2 of 2

It is certified that error appears in the above-identified patent and that said Letters Patent is hereby corrected as shown below:

COLUMN 13
Line 7, change "aid" to --said--

This certificate supersedes the Certificate of Correction issued June 12, 2001

Signed and Sealed this

Seventh Day of August, 2001

*Attest:*

*Attesting Officer*

NICHOLAS P. GODICI
*Acting Director of the United States Patent and Trademark Office*